United States Patent
Goto

(10) Patent No.: US 11,042,614 B2
(45) Date of Patent: Jun. 22, 2021

(54) AUTHENTICATION DEVICE AND AUTHENTICATION METHOD

(71) Applicant: TOYOTA JIDOSHA KABUSHIKI KAISHA, Toyota (JP)

(72) Inventor: Yuya Goto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 183 days.

(21) Appl. No.: 16/014,397

(22) Filed: Jun. 21, 2018

(65) Prior Publication Data

US 2019/0005218 A1 Jan. 3, 2019

(30) Foreign Application Priority Data

Jun. 28, 2017 (JP) .............................. JP2017-126182

(51) Int. Cl.
*G06F 21/32* (2013.01)
*G06K 9/00* (2006.01)
*G06K 9/62* (2006.01)
*G07C 9/00* (2020.01)
*H04L 29/08* (2006.01)

(52) U.S. Cl.
CPC ......... *G06F 21/32* (2013.01); *G06K 9/00885* (2013.01); *G06K 9/6201* (2013.01); *G07C 9/00563* (2013.01); *H04L 67/12* (2013.01)

(58) Field of Classification Search
CPC ..... G06F 21/32; G06F 21/31; H04L 63/0861; H04L 9/3231; H04L 67/306
See application file for complete search history.

(56) References Cited

U.S. PATENT DOCUMENTS

| | | | |
|---|---|---|---|
| 2003/0220835 A1* | 11/2003 | Barnes, Jr. .......... | G06F 3/04842 705/14.36 |
| 2007/0124599 A1 | 5/2007 | Morita et al. | |
| 2010/0284575 A1 | 11/2010 | Yoshimine et al. | |
| 2010/0305779 A1* | 12/2010 | Hassan .................. | H01Q 1/325 701/2 |
| 2013/0225129 A1 | 8/2013 | Norbisrath et al. | |
| 2015/0242605 A1 | 8/2015 | Du et al. | |
| 2015/0254445 A1 | 9/2015 | Takagi | |
| 2017/0053149 A1 | 2/2017 | Jiang et al. | |

(Continued)

FOREIGN PATENT DOCUMENTS

| | | |
|---|---|---|
| CN | 106709399 A | 5/2017 |
| JP | 2002-342862 A | 11/2002 |

(Continued)

*Primary Examiner* — Chau Le
*Assistant Examiner* — Andrew Suh
(74) *Attorney, Agent, or Firm* — Oliff PLC

(57) ABSTRACT

An authentication device that uses biometric authentication includes an acquisition unit configured to acquire first biometric information of a user, a storage unit configured to store second biometric information which is preregistered, a processing unit configured to obtain an authentication determination value based on similarity between the first biometric information acquired by the acquisition unit and the second biometric information stored in the storage unit, and a decision unit configured to decide a service providable to the user based on the authentication determination value and a plurality of thresholds to which different services are respectively assigned.

4 Claims, 3 Drawing Sheets

| THRESHOLD | SERVICE |
|---|---|
| FIRST THRESHOLD T1 | FIRST LEVEL SERVICE |
| SECOND THRESHOLD T2 | SECOND LEVEL SERVICE |
| THIRD THRESHOLD T3 | THIRD LEVEL SERVICE |
| ⋮ | ⋮ |
| n-TH THRESHOLD Tn | n-TH LEVEL SERVICE |

(56) References Cited

U.S. PATENT DOCUMENTS

| | | | |
|---|---|---|---|
| 2017/0286657 A1* | 10/2017 | Weber | G06K 9/00073 |
| 2018/0089453 A1* | 3/2018 | Scholz | G06F 21/36 |
| 2018/0137266 A1* | 5/2018 | Kim | G10L 15/22 |

FOREIGN PATENT DOCUMENTS

| | | |
|---|---|---|
| JP | 2003-237504 A | 8/2003 |
| JP | 2007-145200 A | 6/2007 |
| JP | 2007-177476 A | 7/2007 |
| JP | 2008-084044 A | 4/2008 |
| JP | 2010-198384 A | 9/2010 |
| JP | 2015-170101 A | 9/2015 |
| WO | 2009/096475 A1 | 8/2009 |
| WO | 2016/001657 A1 | 1/2016 |

* cited by examiner

FIG. 2

| THRESHOLD | SERVICE |
|---|---|
| FIRST THRESHOLD T1 | FIRST LEVEL SERVICE |
| SECOND THRESHOLD T2 | SECOND LEVEL SERVICE |
| THIRD THRESHOLD T3 | THIRD LEVEL SERVICE |
| ⋮ | ⋮ |
| n-TH THRESHOLD Tn | n-TH LEVEL SERVICE |

AUTHENTICATION DEVICE AND AUTHENTICATION METHOD

INCORPORATION BY REFERENCE

The disclosure of Japanese Patent Application No. 2017-126182 filed on Jun. 28, 2017 including the specification, drawings and abstract is incorporated herein by reference in its entirety.

BACKGROUND

1. Technical Field

The present disclosure relates to an authentication device and an authentication method that use biometric authentication.

2. Description of Related Art

Japanese Unexamined Patent Application Publication No. 2003-237504 (JP 2003-237504 A) and Japanese Unexamined Patent Application Publication No. 2015-170101 (JP 2015-170101 A) disclose a device that provides a desired service to a user using so-called biometric authentication that determines whether or not a person is valid using biological characteristics (biometric information) of the person. The biometric information includes physiological characteristics based on physiological appearance such as a face, a fingerprint, an iris, and a vein, and behavioral characteristics based on behavioral features such as a voice and a signature.

A threshold used for determining success or failure of biometric authentication is required to be set to an optimal value in consideration of a ratio of false rejection (false rejection rate) in which the authentication of a valid person fails and a ratio of false acceptance (false acceptance rate) in which the authentication of an invalid person succeeds.

SUMMARY

In order to achieve a high level of security, in a typical biometric authentication process, a threshold used for determining success or failure of biometric authentication is set to be relatively high in accordance with a service that requires the highest level of security. Therefore, in some cases, the biometric authentication process based on a relatively high threshold may be excessive when a service with a relatively low level of security is used.

For example, even in a situation where authentication may succeed with glasses in facial authentication, the excessive biometric authentication process in which authentication has to be performed again using accurate and precise biometric information without glasses due to the relatively high set threshold decreases the user's convenience.

The disclosure provides an authentication device and an authentication method that can further improve user's convenience in service use.

A first aspect of the disclosure relates to an authentication device that uses biometric authentication. The authentication device includes an acquisition unit configured to acquire first biometric information of a user, a storage unit configured to store second biometric information which is preregistered, a processing unit configured to obtain an authentication determination value based on similarity between the first biometric information acquired by the acquisition unit and the second biometric information stored in the storage unit, and a decision unit configured to decide a service providable to the user based on the authentication determination value and a plurality of thresholds to which different services are respectively assigned.

According to the first aspect of the disclosure, services are respectively assigned in advance to different thresholds in accordance with the level of security required for each service to be provided. The service providable to the user is decided based on the threshold that is satisfied by the authentication determination value obtained based on the similarity of the first biometric information of the user among the thresholds.

By such a control, for example, by setting the lowest threshold for a service with a relatively low level of security, the probability of the obtained authentication determination value satisfying the threshold to succeed in biometric authentication can be further increased even when the read biometric information of the user is not relatively accurate and precise. Thus, a service with a relatively low level of security can be used through easy authentication, and therefore user's convenience in service use is further improved.

In the authentication device according to the first aspect of the disclosure, the processing unit may obtain a higher authentication determination value as the number of matching feature points or similar feature points between the first biometric information and the second biometric information is increased.

In the authentication device according to the first aspect of the disclosure, the decision unit may decides that a service assigned to a threshold satisfied by the authentication determination value among the thresholds is the service providable to the user.

In the authentication device according to the first aspect of the disclosure, the decision unit may respectively assign a first level service, a second level service, and a third level service to a first threshold, a second threshold, and a third threshold. The decision unit may decide that the third level service is the service providable to the user when the authentication determination value is equal to or higher than the third threshold and lower than the second threshold. The decision unit may decide that each of the second level service and the third level service is the service providable to the user when the authentication determination value is equal to or higher than the second threshold and lower than the first threshold. The decision unit may decide that each of the first level service, the second level service, and the third level service is the service providable to the user when the authentication determination value is equal to or higher than the first threshold. According to the first aspect of the disclosure, user's convenience is further improved.

In the authentication device according to the first aspect of the disclosure, each of the first biometric information and the second biometric information may include at least one piece of information of a face, a fingerprint, an iris, a retina, a voiceprint, a vein, or DNA. In the authentication device according to the first aspect of the disclosure, the authentication device may be mounted in a vehicle. The acquisition unit may acquire the first biometric information of the user, the first biometric information being read by a reading device installed inside a vehicle cabin.

A second aspect of the disclosure relates to an authentication method executed by a processor of an authentication device that uses biometric authentication. The authentication method includes, by the processor, acquiring first biometric information of a user, obtaining an authentication determination value based on similarity between the first biometric information and second biometric information which is preregistered, and deciding a service providable to the user based on the authentication determination value and a plurality of thresholds to which different services are respectively assigned.

According to the second aspect of the disclosure, services are respectively assigned in advance to different thresholds in accordance with the level of security required for each service to be provided. The service providable to the user is decided based on the threshold that is satisfied by the authentication determination value based on the similarity of the first biometric information of the user among the thresholds.

With the authentication method, for example, by setting the lowest threshold for a service with a relatively low level of security, the probability of the obtained authentication determination value satisfying the threshold to succeed in biometric authentication can be increased even when the read biometric information of the user is not relatively accurate and precise. Thus, a service with a relatively low level of security can be used through easy authentication, and therefore user's convenience in service use is further improved.

As described above, according to the aspects of the disclosure, user's convenience in service use can be further improved in the authentication device that uses biometric authentication.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 2 is a table illustrating an example of services assigned to thresholds.

DETAILED DESCRIPTION OF EMBODIMENTS

Overview

The disclosure provides an authentication device that uses biometric authentication. In the authentication device, services are assigned in advance to thresholds in accordance with the level of security required for each service to be provided. When authentication of a user succeeds, a service assigned to the threshold that is satisfied by an authentication determination value obtained based on the similarity of biometric information of the user is decided to be a service providable to the user. Accordingly, a service with a relatively low level of security can be used through easy authentication, and therefore user's convenience is further improved.

Configuration of Authentication Device

Figure 1:
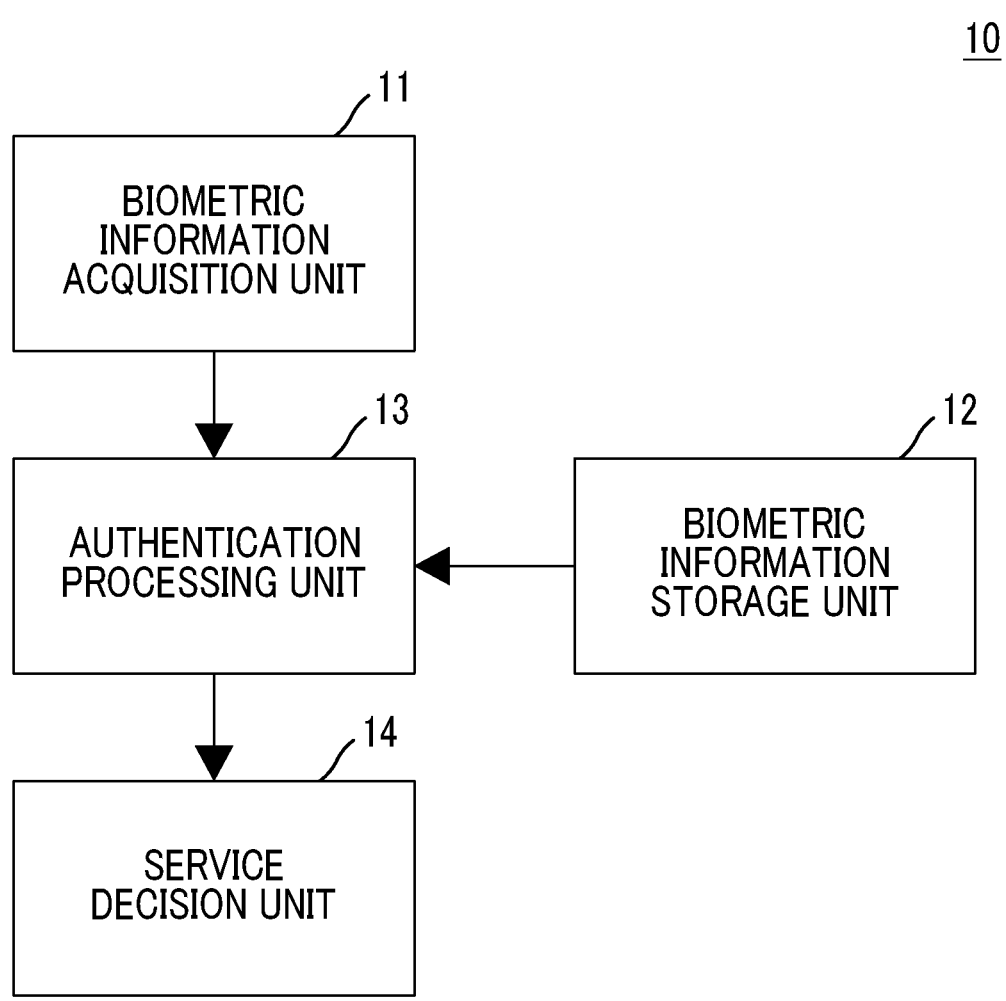
FIG. 1 is a schematic diagram for describing a configuration of an authentication device according to an embodiment.

FIG. 1 is a schematic diagram illustrating the configuration of an authentication device 10 according to an embodiment of the disclosure. The authentication device 10 according to the present embodiment illustrated in FIG. 1 includes a biometric information acquisition unit 11, a biometric information storage unit 12, an authentication processing unit 13, and a service decision unit 14. The biometric information acquisition unit 11, the biometric information storage unit 12, the authentication processing unit 13, and the service decision unit 14 can respectively be regarded as an acquisition unit, a storage unit, a processing unit, and a decision unit in the aspects of the disclosure.

The present embodiment set forth below, will be described using, as an example, a case where the authentication device 10 is installed in a vehicle such as a passenger car and an operation of the vehicle is provided as a service. In addition to the vehicle described in the present embodiment, the authentication device 10 according to the present embodiment can be installed at various places where a biometric authentication process is required for providing a service such as permitting entry or exit into or from a predetermined area such as a building and a room, and permitting withdrawal or deposit of money of an automated teller machine (ATM) and the like.

The biometric information acquisition unit 11 can acquire biometric information of a person. More specifically, the biometric information acquisition unit 11 can acquire first biometric information (hereinafter, referred to as "input biometric information") that is input by a user who uses the vehicle. The input biometric information can be read by one or a plurality of predetermined reading devices (not illustrated) installed inside and outside a vehicle cabin. Examples of the biometric information include a face, a fingerprint or a vein on a finger, an iris of an eyeball, a retina, a voiceprint, and deoxyribonucleic acid (DNA) of a person.

For example, as the reading device, a camera sensor that is installed near a dashboard or an instrument panel of the vehicle and can acquire an image of the face of an occupant in the seat can be used. For example, as the reading device, a fingerprint sensor that is installed near a door handle of the vehicle and can detect a fingerprint can be used. The input biometric information acquired by the biometric information acquisition unit 11 is output to the authentication processing unit 13. As the reading device, a well-known device other than the above-described sensors can be used.

The biometric information storage unit 12 is configured of, for example, a memory and can store biometric information of a person. More specifically, the biometric information storage unit 12 stores in advance second biometric information (hereinafter, referred to as "registered biometric information") of one or more registered users. The registered biometric information may be stored in advance in the biometric information storage unit 12 through the biometric information acquisition unit 11 or may be stored in advance in the biometric information storage unit 12 through a configuration other than the biometric information acquisition unit 11 by data transmission or the like from, for example, a smartphone.

The authentication processing unit 13 compares the input biometric information acquired by the biometric information acquisition unit 11 with the registered biometric information stored in the biometric information storage unit 12. The authentication processing unit 13 performs authentication of the user who uses the vehicle by obtaining an authentication determination value D (score) based on the similarity between the input biometric information and the registered biometric information. More specifically, the authentication processing unit 13 determines that biometric authentication of the user who uses the vehicle succeeds in a case where the authentication determination value D obtained based on the similarity between the input biometric information and the registered biometric information is equal to or higher than a predetermined threshold that is a reference for authenticating the validity of the user.

The authentication processing unit 13 can obtain the authentication determination value D according to the level of match or similarity between a feature point extracted from the input biometric information and a feature point of the registered biometric information. More specifically, the authentication processing unit 13 obtains a higher value of the authentication determination value D as the number of matching feature points or similar feature points between the input biometric information and the registered biometric information is increased. As a method of extracting a feature point from the biometric information, a well-known technology can be used, and thus, the detailed description will not be provided.

For example, in a case where biometric authentication of a certain registered user is performed using an image of the face of the user, an image of a face fully facing a camera that is the reading device is considered to have more locations of matching feature points or similar feature points than an image of a face facing a camera slightly slantwise. Thus, the authentication determination value D for the image of the face fully facing a camera is obtained to be higher than the authentication determination value D for the image of the face facing a camera slightly slantwise. In addition, an image of the face without a mask or glasses is considered to have more locations of matching feature points or similar feature points than an image of the face with a mask or glasses. Thus, the authentication determination value D for the image of the face with a mask or glasses is obtained to be lower than the authentication determination value D for the image of the face without a mask or glasses.

As described above, the authentication processing unit 13 can indicate a difference between high and low levels of similarity between the registered biometric information and the input biometric information by changing the magnitude of the authentication determination value D to be obtained. The authentication determination value D obtained by the authentication processing unit 13 is output to the service decision unit 14.

The service decision unit 14 decides a service providable to the user based on the authentication determination value D obtained by the authentication processing unit 13 for the input biometric information. For deciding the service, the service decision unit 14 has a plurality of thresholds to which different services are respectively assigned. FIG. 2 illustrates an example of services assigned to thresholds. As will be described below, typically, a threshold is set in accordance with the level of security required for a service to be provided.

For example, when an operation of the vehicle is considered as a service, the highest level of security is required for permitting start-up of an engine of the vehicle or permitting a charging process (hotel reservation, application purchase, and the like) through a vehicle-mounted navigation device. Thus, a high threshold (hereinafter, referred to as a "first threshold T1") is set for the above-described service (first level service). A relatively high level of security is required for permitting checking of an email or reading of a schedule accumulated in the vehicle through a smartphone of the user. Thus, a medium threshold (hereinafter, referred to as a "second threshold T2"; T2<T1) is set for the above-described service (second level service). A relatively high level of security is not required for setting a seat position (customization) of the vehicle. Thus, a low threshold (hereinafter, referred to as a "third threshold T3"; T3<T2) is set for the above-described service (third level service). The number of thresholds of the service decision unit 14 is not limited to three. Any number of thresholds can be set in accordance with the number n (n is any integer) of service levels as illustrated in FIG. 2.

In the setting example, in a case where the authentication determination value D obtained by the authentication processing unit 13 does not satisfy (exceed) the first threshold T1 and the second threshold T2 but satisfies (exceeds) the third threshold T3, determination is made that the third level service is providable to the user. That is, for example, in the case of the service for setting a seat position that does not require a relatively high level of security, the service can be immediately used without performing the authentication process again by causing a user to fully face the camera again or causing a user to take off a mask or glasses in the biometric authentication using the image of the face. Thus, user's convenience in service use is further improved.

In the setting example, for example, in a case where the authentication determination value D obtained by the authentication processing unit 13 satisfies only the second threshold T2 (does not exceed the first threshold T1), in order to start up the engine of the vehicle, the authentication process based on accurate and precise biometric information for satisfying (exceeding) the first threshold T1 is required again by causing a user to fully facing the camera again or causing a user to take off a mask or glasses in the biometric authentication using the image of the face. Accordingly, a higher level of safety is secured for a service that requires a high level of security.

All or a part of the biometric information acquisition unit 11, the biometric information storage unit 12, the authentication processing unit 13, and the service decision unit 14 may be typically configured as an electronic control unit (ECU) that includes a processor such as a central processing unit (CPU), a memory, an input and output interface, and the like. The electronic control unit can implement the function described above by the CPU reading and executing a predetermined program stored in the memory.

Control Performed by Authentication Device

Figure 3:
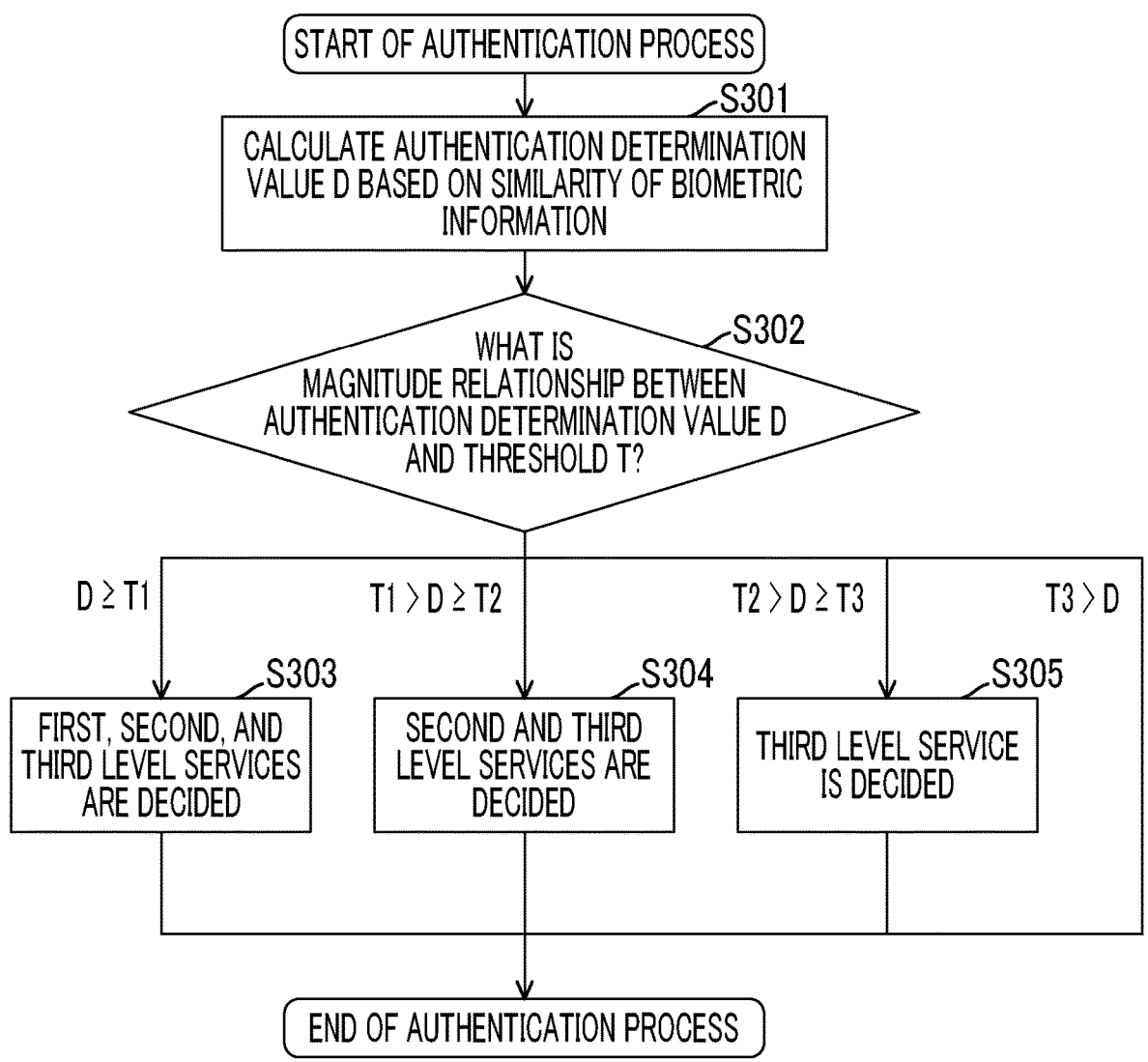
FIG. 3 is a flowchart illustrating a procedure of an authentication process executed by an authentication processing unit of the authentication device.

FIG. 3 is a flowchart illustrating a procedure of an authentication process executed by the authentication processing unit 13 of the authentication device 10 according to the embodiment. While an example in which the first level service to the third level service are assigned to the first threshold T1 to the third threshold T3 is described in FIG. 3, it is easily understood from FIG. 3 that a case where a different number of services from the present example are assigned to thresholds can be processed in the same manner as the present example.

For example, the authentication process illustrated in FIG. 3 starts when the biometric information acquisition unit 11 acquires the biometric information of the user.

Step S301: In the process of step S301, the authentication determination value D is obtained based on the similarity between the first biometric information (input biometric information) of the user acquired by the biometric information acquisition unit 11 and the second biometric information (registered biometric information) stored in the biometric information storage unit 12. When the authentication determination value D is obtained, the process proceeds to step S302.

Step S302: In the process of step S302, determination as to which of the thresholds set in advance is satisfied by the authentication determination value D obtained in step S301 is performed. In the present example, determination on whether the authentication determination value D is equal to or higher than the first threshold T1, is equal to or higher than the second threshold T2 and lower than the first threshold T1, is equal to or higher than the third threshold T3 and lower than the second threshold T2, or is lower than the third threshold T3 is performed.

When the authentication determination value D is determined to be equal to or higher than the first threshold T1 (D≥T1), the process proceeds to step S303. When the authentication determination value D is determined to be equal to or higher than the second threshold T2 and lower than the first threshold T1 (T1>D≥T2), the process proceeds to step S304. When the authentication determination value D is determined to be equal to or higher than the third threshold T3 and lower than the second threshold T2 (T2>D≥T3), the process proceeds to step S305. When the authentication determination value D is determined to be lower than the third threshold T3 (T3>D), determination is made that the authentication of the user as a valid person fails, and the present authentication process is finished.

Step S303: In the process of step S303, the first level service assigned to the first threshold T1 is decided to be a service providable to the user. In the present example, the second level service assigned to the second threshold T2 and the third level service assigned to the third threshold T3 that require a lower level of security than the first level service are also decided to be services providable to the user in addition to the first level service assigned to the first threshold T1. After such a decision, the present authentication process is finished.

Step S304: In the process of step S304, a decision is made that the second level service assigned to the second threshold T2 is a service providable to the user. In the present example, the third level service that is assigned to the third threshold T3 and requires a lower level of security than the second level service is also decided to be a service providable to the user in addition to the second level service assigned to the second threshold T2. After such a decision, the present authentication process is finished.

Step S305: In the process of step S305, the third level service assigned to the third threshold T3 is decided to be a service providable to the user. After such a decision, the present authentication process is finished.

Action and Effect of Present Embodiment

As described above, with the authentication device 10 according to the embodiment, services are assigned to different thresholds in advance in accordance with the level of security required for each service to be provided. The service assigned to the threshold that is satisfied by the authentication determination value obtained based on the similarity of the biometric information of the user is decided to be a service providable to the user.

By such a control, for example, by setting a low threshold (third threshold T3) in advance for a service with a relatively low level of security (setting of a seat position which is the third level service), the probability of the obtained authentication determination value satisfying the low threshold can be further increased even when the read biometric information of the user is not relatively accurate and precise. Thus, a service with a relatively low level of security can be used through easy authentication, and therefore user's convenience in service use is further improved.

APPLICATION EXAMPLE

When the authentication process is performed using the image of the face as described in the embodiment, the camera or the like acquires the image of the face as the biometric information at all times, and the authentication process is executed without making the user aware of the authentication process. In such a case, for example, information indicating the current level of authentication or currently available services may be presented to the user. For example, the user can be notified of such information by displaying information of an authentication level or displaying available services on the screen of a multi-information display or the navigation device. Thus, user's convenience can be further improved.

For example, in a case where the authentication process is required each time a service is used such as a fingerprint sensor disposed in a door handle for unlocking the door, the result of authentication may be controlled to be maintained for a predetermined period of time. When the result of authentication is controlled in a time-restricted manner, for example, a situation where a third person starts up the engine while the registered user walks away from the vehicle after succeeding in a high-level authentication process can be suppressed. Thus, security can be further improved.

When a service is used, in a case where the authentication process is performed using a dedicated reading device corresponding to the service to be used, the threshold for determination of success in authentication can be fixedly set in advance. For example, the third threshold T3 for which the level of security is the lowest can be set for authentication of biometric information input from a fingerprint sensor disposed in a mirror adjusting switch for changing the angle of a wing mirror. The first threshold T1 for which the level of security is the highest can be set for authentication of biometric information input from a fingerprint sensor disposed in a start button for starting up the engine.

The authentication device and the authentication method can be used for an authentication device that uses biometric authentication, and are particularly useful when user's convenience in service use is desired to be improved.

What is claimed is:

1. An authentication device for a vehicle that uses biometric authentication, the authentication device comprising:
   a fingerprint sensor that is provided on a switch for starting power of the vehicle, the fingerprint sensor being configured to read a fingerprint of a user;
   a storage unit configured to store fingerprint information of the user, the fingerprint information being preregistered;
   a processing unit configured to obtain an authentication determination value indicating a degree of matching or similarity between the fingerprint read by the fingerprint sensor and the fingerprint information stored in the storage unit;
   a decision unit configured to:
   (i) decide services that can be provided to the user based on the authentication determination value when the authentication determination value is equal to or higher than a first threshold value, the services including a start-up of an engine of a vehicle, a charging process via a navigation device mounted on the vehicle, checking of an email accumulated in the vehicle via a smartphone of the user, reading of a schedule accumulated in the vehicle via a smartphone of the user, setting a seat position of the vehicle and customization of the vehicle;
   (ii) decide services that can be provided to the user based on the authentication determination value when the authentication determination value is equal to or higher than the second threshold and lower than the first threshold, the services including checking of an email accumulated in the vehicle via a smartphone of the user, reading of a schedule accumulated in the vehicle via a smartphone of the user, setting a seat position of the vehicle and customization of the vehicle;

(iii) decide services that can be provided to the user based on the authentication determination value when the authentication determination value is equal to or higher than the third threshold and lower than the second threshold, the services including setting a seat position of the vehicle and customization of the vehicle; and (iv) maintain a decision regarding the services that can be provided to the user for a predetermined time from the decision; and a display unit configured to display information based on the authentication determination value or a permitted operation of the vehicle on an in-vehicle display when the operation of the vehicle is permitted by the decision unit.

2. The authentication device according to claim 1, wherein the decision unit is configured to:
discard the decision after the predetermined period of time has elapsed.

3. An authentication method executed by a processor of an authentication device for a vehicle that uses biometric authentication, the authentication method comprising:

reading, by a fingerprint sensor, a fingerprint of a user, the fingerprint sensor being provided on a switch for starting power of the vehicle;

obtaining, by a processor, an authentication determination value indicating a degree of matching or similarity between the fingerprint read by the fingerprint sensor and fingerprint information of the user, the fingerprint information being stored in a storage unit and preregistered;

deciding, by the processor, services that can be provided to the user based on the authentication determination value when the authentication determination value is equal to or higher than a first threshold value, the services including a start-up of an engine of a vehicle, a charging process via a navigation device mounted on the vehicle, checking of an email accumulated in the vehicle via a smartphone of the user, reading of a schedule accumulated in the vehicle via a smartphone of the user, setting a seat position of the vehicle and customization of the vehicle;

deciding, by the processor, services that can be provided to the user based on the authentication determination value when the authentication determination value is equal to or higher than the second threshold and lower than the first threshold, the services including checking of an email accumulated in the vehicle via a smartphone of the user, reading of a schedule accumulated in the vehicle via a smartphone of the user, setting a seat position of the vehicle and customization of the vehicle;

deciding, by the processor, services that can be provided to the user based on the authentication determination value when the authentication determination value is equal to or higher than the third threshold and lower than the second threshold, the services including setting a seat position of the vehicle and customization of the vehicle; and maintaining, by the processor, a decision regarding the services that can be provided to the user for a predetermined time from the decision; and displaying, by a display unit, information based on the authentication determination value or a permitted operation of the vehicle on an in-vehicle display when the operation of the vehicle is permitted.

4. An authentication device for a vehicle that uses biometric authentication, the authentication device comprising:

a fingerprint sensor that is provided on a switch for starting power of the vehicle, the fingerprint sensor being configured to read a fingerprint of a user;

a processor programmed to:
obtain an authentication determination value indicating a degree of matching or similarity between the fingerprint read by the fingerprint sensor and fingerprint information of the user, the fingerprint information being stored in a storage unit and preregistered;

decide services that can be provided to the user based on the authentication determination value when the authentication determination value is equal to or higher than a first threshold value, the services including a start-up of an engine of a vehicle, a charging process via a navigation device mounted on the vehicle, checking of an email accumulated in the vehicle via a smartphone of the user, reading of a schedule accumulated in the vehicle via a smartphone of the user, setting a seat position of the vehicle and customization of the vehicle;

decide services that can be provided to the user based on the authentication determination value when the authentication determination value is equal to or higher than the second threshold and lower than the first threshold, the services including checking of an email accumulated in the vehicle via a smartphone of the user, reading of a schedule accumulated in the vehicle via a smartphone of the user, setting a seat position of the vehicle and customization of the vehicle;

decide services that can be provided to the user based on the authentication determination value when the authentication determination value is equal to or higher than the third threshold and lower than the second threshold, the services including setting a seat position of the vehicle and customization of the vehicle; and maintain a decision regarding the services that can be provided to the user for a predetermined time from the decision; and a display unit configured to display information based on the authentication determination value or a permitted operation of the vehicle on an in-vehicle display when the operation of the vehicle is permitted by the decision unit.

* * * * *